US006438629B1

(12) United States Patent
Huebner et al.

(10) Patent No.: US 6,438,629 B1
(45) Date of Patent: *Aug. 20, 2002

(54) STORAGE DEVICE BUFFER ACCESS CONTROL IN ACCORDANCE WITH A MONITORED LATENCY PARAMETER

(75) Inventors: Geoffrey L. Huebner, Hopkinton; Bruce D. Buch, Westboro, both of MA (US)

(73) Assignee: Maxtor Corporation, Longmont, CO (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/243,190

(22) Filed: Feb. 2, 1999

(51) Int. Cl.[7] .............................................. G06F 13/00
(52) U.S. Cl. .......................... 710/52; 710/61; 710/124; 710/310; 711/167
(58) Field of Search ................................. 710/128, 126, 710/3–7, 36–40, 52–56, 58–61, 107–125, 310; 711/150–154, 667; 395/287

(56) References Cited

U.S. PATENT DOCUMENTS

| | | | | |
|---|---|---|---|---|
| 5,555,383 A | * | 9/1996 | Elazar et al. | 710/126 |
| 5,862,353 A | * | 1/1999 | Revilla et al. | 395/287 |
| 5,907,688 A | * | 5/1999 | Hauck et al. | 710/107 |
| 6,065,102 A | * | 5/2000 | Peters et al. | 711/151 |
| 6,078,976 A | * | 6/2000 | Obayashi | 710/128 |
| 6,157,978 A | * | 12/2000 | Ng et al. | 710/240 |
| 6,163,831 A | * | 12/2000 | Kermani | 711/150 |
| 6,178,486 B1 | * | 1/2001 | Gill et al. | 711/151 |

FOREIGN PATENT DOCUMENTS

| WO | 97/29432 | * | 8/1997 | G06F/15/00 |
|---|---|---|---|---|

* cited by examiner

Primary Examiner—Christopher B. Shin
(74) Attorney, Agent, or Firm—Pillsbury Winthrop LLP (57) ABSTRACT

A memory subsystem includes a buffer, a storage device, a buffer access determining mechanism, a request communicator, and a disk input/output subsystem. The buffer comprises a buffer channel having a limited data transfer rate. The storage device comprises a read/write mechanism and non-volatile storage media. The determining mechanism determines when a given client is to be given access to the buffer channel. It comprises a latency monitor for monitoring a latency parameter indicative of the buffer channel access latency for the given client and a buffer access controller for controlling when the given client is given access to the buffer channel in accordance with the monitored latency parameter. The request communicator couples requestors to the buffer access determining mechanism. The requesters request the buffer access determining mechanism to give clients access to the buffer channel. When clients are given access to the buffer channel, they write data to or read data from the buffer via the buffer channel. The disk input/output subsystem exchanges data between the buffer and the storage media.

10 Claims, 4 Drawing Sheets

STORAGE DEVICE BUFFER ACCESS CONTROL IN ACCORDANCE WITH A MONITORED LATENCY PARAMETER

BACKGROUND OF THE INVENTION

1. Field of the Invention

The present invention relates to an arbitration mechanism for controlling access to a buffer provided as part of a storage device. More specifically, the present invention relates to a hard disk buffer arbitration subsystem.

2. Description of Background Information

Computer systems (e.g., personal computers, workstations and the like) and intelligent devices (e.g., appliances, kiosks, consumer electronic devices provided with microcontrollers and microprocessors) are typically provided with memory systems having memory hierarchies for handling the computer system's long-term and short-term storage needs. Such memory hierarchies comprise primary (main) storage devices such as the computer's main memory (typically random access memory (RAM)) and secondary (auxiliary) storage devices such as disk drives (typically magnetic hard disks) and other external devices. The memory system manages the exchange of data between the main memory and the auxiliary memory, and thereby enhances the computer's perceived performance. One such management function includes caching—keeping active data in the memory having a higher access speed, i.e., in the main memory. As the data becomes inactive, it is migrated to the lower-speed auxiliary memory. Another function of the memory system involves buffering of data transferred to and from the auxiliary memory. For this purpose, a buffer having a buffer channel with a relatively high data transfer rate is provided. The buffer may be provided as part of the computer, or it may be provided within the storage device containing the auxiliary memory, such as is the case with disk drives with built-in disk buffers, dedicated to disk operations.

The time it takes to access a disk device is substantial in comparison to accessing the primary/main memory. Time is needed for a read/write head to position itself over the track that contains the stored data. It takes more time to rotate the media until the read/write head reaches the stored data. Another delay is encountered in transmitting the data from the auxiliary memory through an input/output port to the main memory. Not only is there a delay due to the transfer rate limitations of the input/output port, but the requester may be temporarily denied access to the input/output port in favor of another requester already using the input/output port.

Disk buffers can alleviate the perceived access delays of the disk device by buffering data in fast memory without burdening the input/output channel feeding to the actual disk media. The disk buffer may also concurrently serve as a cache, accessing and holding disk data not yet but likely to be requested.

The computer system may have clients, e.g., an application and various processes provided within the disk drive, which request access to the disk buffer. Such clients may make concurrent and thus contentious demands on the disk buffer's channel which has a limited data transfer rate. Thus, schemes have been incorporated in disk drives to arbitrate between the various disk buffer access requests. Traditionally, such schemes have included either a fixed priority encoder or a "round-robin" scheme. A fixed priority encoder scheme assigns a fixed request level to each client. A given requestor will gain access to the buffer when two conditions are satisfied. The buffer must not be already is use, and there must be no higher priority client also requesting access to the buffer. In the case of a "round-robin" scheme, each time the buffer finishes an operation, it will circulate from client to client polling for a requester. If a client is requesting at the time it is polled, it will gain access to the buffer. Otherwise, the client must wait for the next occurrence of its poll in the round-robin queue.

Difficulties associated with these approaches are that they assume relatively static requirements such as latency limits and memory bandwidth requirements. This is not always the case with disk drive environments.

There is a need for an arbitration mechanism which will limit the latency associated with buffer access requests for select clients such as disk and micro-instruction buffer accesses during heavy load intervals, but will continue to give priority access to other clients as the load diminishes. The system would be preferably versatile and programmable to allow the varying of priorities assigned to certain clients when vying for access to the buffer.

3. Definitions of Terms

ARBITRATION

In a computer system, a process by which a process, device, or subsystem receives requests for access to a single resource, for example, a channel, and decides which one of the requesters will get access.

CHANNEL

A path or link through which information passes between two devices, subsystems, or units. A channel can be internal and/or external to a computer, and has a limited bandwidth (i.e., rate of data transfer, in bits per second).

CLIENT

A process, which may be performed by a program, task, device, or circuitry, which requests a service provided by another process.

CONTENTION

In a computer system, a process by which two or more devices, entities, or processes vie for access to a single resource, for example, a channel.

DATA TRANSFER

The movement of data from one location to another.

LATENCY

The delay between a request for a data transfer action (involving movement of data from one location to another) and the time the action is performed. When the data transfer is a request for information, the latency is the time from the making of the request to the time the information is supplied to the requester.

SUMMARY OF THE INVENTION

The present invention is provided to improve upon subsystems for arbitrating requests for access to a storage device buffer, by allocating the use of a buffer channel in a manner so as to best accommodate the functionality of the overall computer system and its application. In order to achieve this end, one or more aspects of the present invention may be followed in order to bring about one or more specific objects and advantages, such as those noted below.

One object of the present invention is to provide an improved mechanism for storage device buffer arbitration which limits the latency associated with a buffer access request from select clients.

The present invention, therefore, may be directed to a memory method or system, or one or more parts thereof, for use in a system having a host computer comprising an application and an operating system, or for use in an intelligent device such as an appliance having a microcontroller. Such a computer subsystem or intelligent device may comprise a disk storage device such as a magnetic hard disk storage device.

In accordance with one aspect of the present invention, a memory subsystem is provided. The memory subsystem comprises a buffer, a storage device, a buffer access determining mechanism, a request communicator, and a disk input/output subsystem. The buffer has a limited storage capacity and comprises a buffer channel having a limited data transfer rate. The storage device comprises a read/write mechanism and non-volatile storage media. The buffer access determining mechanism determines when a given client is to be given access to the buffer channel. The buffer access determining mechanism comprises a latency monitor for monitoring a latency parameter indicative of buffer channel access latency for the given client, and further comprises a buffer access controller for controlling when the given client is given access to the buffer channel in accordance with the monitored latency parameter.

The request communicator couples requestors to the buffer access determining mechanism. The requestors request the buffer access determining mechanism to give clients access to the buffer channel. When they are given access to the buffer channel, the clients write data to or read data from the buffer via the buffer channel. The disk input/output subsystem exchanges data between the buffer and the storage media.

The memory subsystem may be a disk storage memory subsystem, having a translating component for receiving memory access requests from an external process of a host computer or microcontroller and translating the memory access requests to memory access requests corresponding to actual addresses located in the buffer. More specifically, the memory subsystem may be a peripheral hard disk device. The buffer may comprise a volatile high speed transfer rate memory, such as a random access memory. The storage device may comprise a non-volatile memory having a lower transfer rate, such as a disk storage device (e.g., a magnetic hard disk storage device). The buffer access determining mechanism may comprise an arbitrator.

The latency monitor may comprise a setting register, a counter, and a high latency signaller. The setting register holds a value representing a threshold delay in granting a given client access to the buffer. The counter counts an amount of time elapsing from a reset time. The reset time may be the last time the given client was granted access, or the time at which the given client requests access to the buffer. The high latency signaller signals to the buffer access controller when the threshold delay has been reached by the counter. To render the latency monitor easily configurable, the setting register may be software programmable.

The buffer channel access controller may comprise a priority-based arbitrator which assigns to an access request from the given client a default priority when the threshold delay has not been reached by the counter, and a higher priority when the threshold delay has been reached by the counter. The priority-based arbitrator may comprise a fixed-priority encoder.

In accordance with another aspect of the present invention, a hard disk buffer arbitration subsystem may be provided which responds to client requests to provide, to a microprocessor or microcontroller, disk input/output processes, and hard disk control processes, access to the buffer. A latency monitor is provided for monitoring a latency parameter indicative of the buffer access latency for a given client. A buffer access controller controls when the given client is given access to the buffer in accordance with the latency parameter. The buffer may comprise a random access memory.

The latency monitor may comprise a setting register, a counter, and a high latency signaller. The setting register holds a value representing a threshold delay in granting a given client access to the buffer. The counter counts an amount of time elapsing from a reset time—e.g., a time at which a buffer access request was last granted to the given client. The high latency signaller signals to the buffer access controller when the threshold delay has been reached by the counter. The setting register may be software programmable. The buffer channel access controller may comprise a priority-based arbitrator which assigns to an access request from the given client a default priority when the threshold delay has not been reached by the counter and a higher priority when the threshold delay has been reached by the counter. The priority-based arbitrator may comprise a fixed-priority encoder.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout the several views and wherein.

DETAILED DESCRIPTION OF AN EXEMPLARY EMBODIMENT

Figure 1:
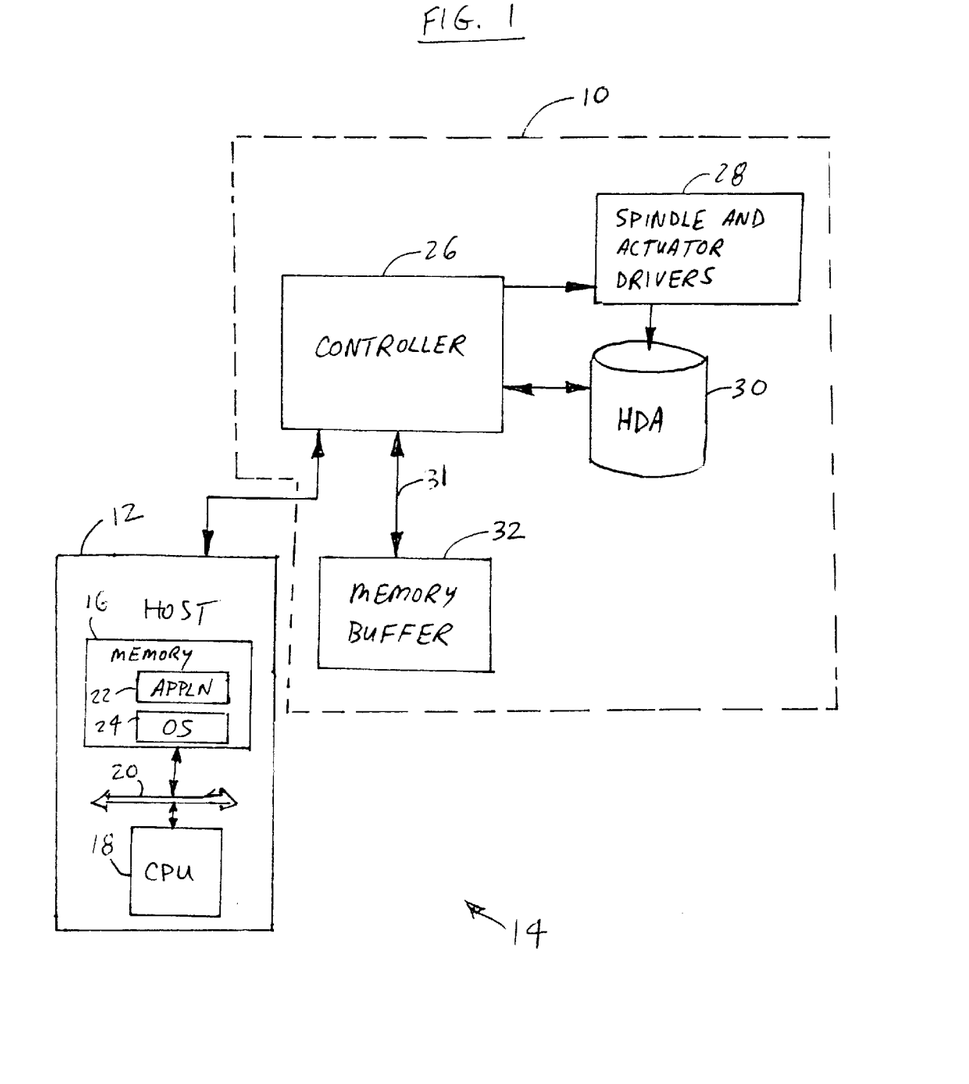
FIG. 1 is a block diagram of a computer system including a host computer and a hard disk.

Referring now to the drawings in greater detail, FIG. 1 shows a computer system 14 comprising a host computer 12 coupled to a hard disk 10. The illustrated host computer 12 comprises a CPU 18 and a memory 16, at least a portion of which comprises the main memory of the host computer 12. An application 22 and an operating system 24 are each provided, resident in memory 16. Hard disk 10 is coupled to host computer 12 by a standardized interface such as a SCSI, ESDI, or IDE interface. Hard disk 10 comprises, in the illustrated embodiment, a hard disk central controller 26, a memory buffer 32, spindle and actuator drivers 28, and a head disk assembly (HDA) 30. Hard disk central controller 26 is connected to spindle and actuator drivers 28, head disk assembly 30, and memory buffer 32 via known interfacing mechanisms. The connection to memory buffer 32 comprises a buffer channel 31 having a limited transfer rate.

Hard disk 10 serves as a virtual disk storage memory subsystem, and has a translating component which receives virtual memory access requests from one or both of application 22 and operating system 24 and translates the virtual memory access requests to memory access requests corresponding to actual addresses located in memory buffer 32. Hard disk 10 further comprises caching and buffering components which facilitate, among other functions, the migration of data from memory buffer 32 to the disk media via head disk assembly 30.

In the illustrated embodiment, the memory subsystem comprises a hard disk device 10. Memory buffer 32 comprises a volatile high transfer rate memory which, in the illustrated embodiment, comprises a random access memory device.

While the embodiment illustrated in FIG. 1 is used in connection with a host computer, alternatively a storage device such as hard disk 10 may be coupled to a microcontroller or microprocessor provided as part of an intelligent device, such as an appliance, a consumer electronic device, a kiosk, or any other computerized/automated device or system.

Figure 2:
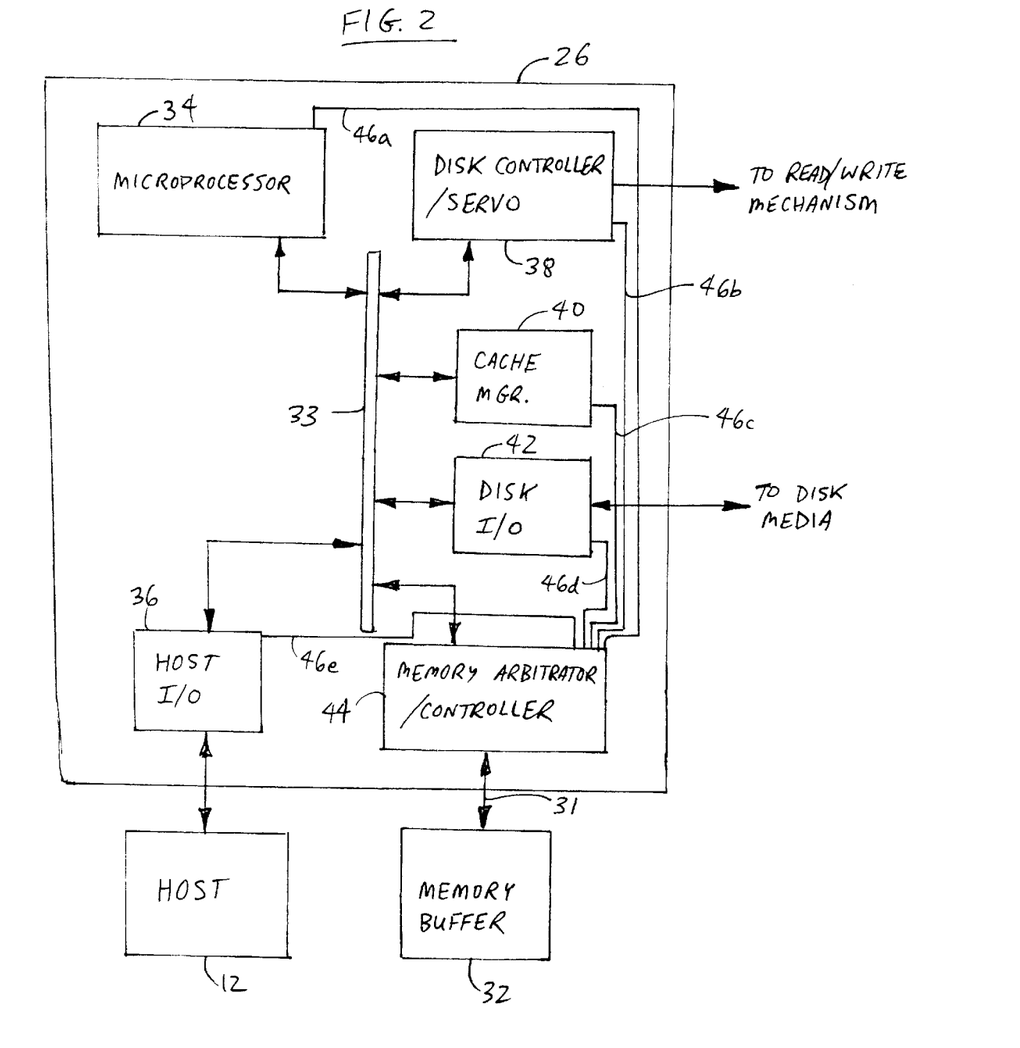
FIG. 2 is a more detailed block diagram of certain portions of the hard disk illustrated in FIG. 1 in accordance with an illustrated embodiment of the present invention.

FIG. 2 is a block diagram illustrating in further detail various components of the hard disk 10 illustrated in FIG. 1.

Head disk assembly 30 comprises, among other elements, data storage media. In the embodiment, the data storage media is disk media, which may comprise, for example, magnetic disk media or optical disk media. Head disk assembly 30 accordingly comprises disk platters, read/write heads, a head actuator mechanism, a spindle motor, a logic board, cables and connectors, and configuration items such as jumpers or switches. Spindle and actuator drivers 28 comprise a spindle driver for driving a spindle motor controlling the rotation of the platters, and an actuator driver which drives a read/write head actuator. More specifically, the actuator drive moves the heads across the disk and accurately positions them above a desired cylinder.

As shown in FIG. 2, hard disk central controller 26 comprises a microprocessor 34, a host I/O interface 36, a disk controller/servo 38, a cache manager 40, a disk I/O interface 42, and a memory arbitrator/controller 44. A parallel bus 33 is provided to which each of the aforementioned units is connected. Each of the units, forming a part of hard disk central controller 26, may communicate with another unit via parallel bus 33, to carry out typical data management operations associated with a hard disk device. In the illustrated embodiment, parallel bus 33 is of a dimension sufficient (e.g., 16 bits, 32 bits, or more) to avoid unwanted delays such as in accessing memory buffer 32.

As shown in FIG. 2, each of microprocessor 34, host I/O interface 36, disk controller/servo 38, cache manager 40, and disk I/O interface 42 comprises a respective one of several single bit direct connection lines 46a–46e connected directly to memory arbitrator/controller 44. Each of these lines 46a–46e is an arbitration request line. Each of the illustrated controller units sends an arbitration request via its respective arbitration request line to memory arbitrator/controller 44 in order to obtain access to memory buffer 32. Memory arbitrator/controller 44 serves as a buffer access determining mechanism, and determines when a given client of memory buffer 32 is to be given access to buffer channel 31. Memory buffer 32 has a limited storage capacity and comprises a buffer channel 31 having a limited data transfer rate, thus defining a maximum access bandwidth to memory buffer 32.

The various controller units provided as part of hard disk central controller 26 manage the exchange of data between host computer 12 and the auxiliary hard disk storage device 10 and further manage the exchange of data within hard disk storage device 10 which serves as a disk storage memory subsystem. Accordingly, the management process will translate memory access requests it receives from application 22 or operating system 24 to memory access requests corresponding to actual addresses located within memory buffer 32. If disk data is requested not yet having an actual address located within the memory buffer 32, or the destination is not within memory buffer 32, the process will trigger the operation of disk I/O interface 42 to load the requested data in buffer 32 from the disk media.

Microprocessor 34 executes an instruction-execution sequence, in accordance with information it fetches from memory buffer 32 via memory arbitrator/controller 44. Disk controller/servo performs functionality associated with keeping the drive running, and obtains needed micro data from memory buffer 32 via memory arbitrator/controller.

Disk controller/servo further controls the read/write head servo mechanism, and, for this purpose, stores and retrieves servo data in memory buffer 32-via memory arbitrator/controller 44. Cache manager 40 sets up instructions within memory buffer 32 to be later accessed and utilized by disk controller/servo 38 and by disk I/O interface 42, and accordingly provides direction to each of disk I/O interface 42 and disk controller/servo 38 to control the exchange of data between memory buffer 32 and the disk media.

Disk I/O interface 42 handles reads from and writes to the disk media. Disk I/O interface 42 stores disk data, read from the disk media, in memory buffer 32.

Host I/O interface 36 hands off data to and from host computer 12, and stores host data within memory buffer 32 via memory arbitrator/controller 44.

In each of these various situations, any one or all of the various control units provided as part of hard disk central controller 26 is a client of memory buffer 32.

The illustrated controller units which require access to memory buffer 32 include microprocessor 34, disk controller/servo 38, cache manager 40, disk I/O interface 42, and host I/O interface 36. Other controller units (not shown) could be provided as well, thus increasing the demand for access to memory buffer 32 and the accompanying need to manage such access with the use of an arbitration scheme. For example, one or more additional units may be provided which perform operations on data within the memory buffer, e.g., for facilitating RAID operations, search routines, and so on. Accordingly, in the illustrated embodiment, a memory arbitrator/controller 44 is provided to manage the conflicting access requests that are encountered in such a hard disk controller.

Figure 3:
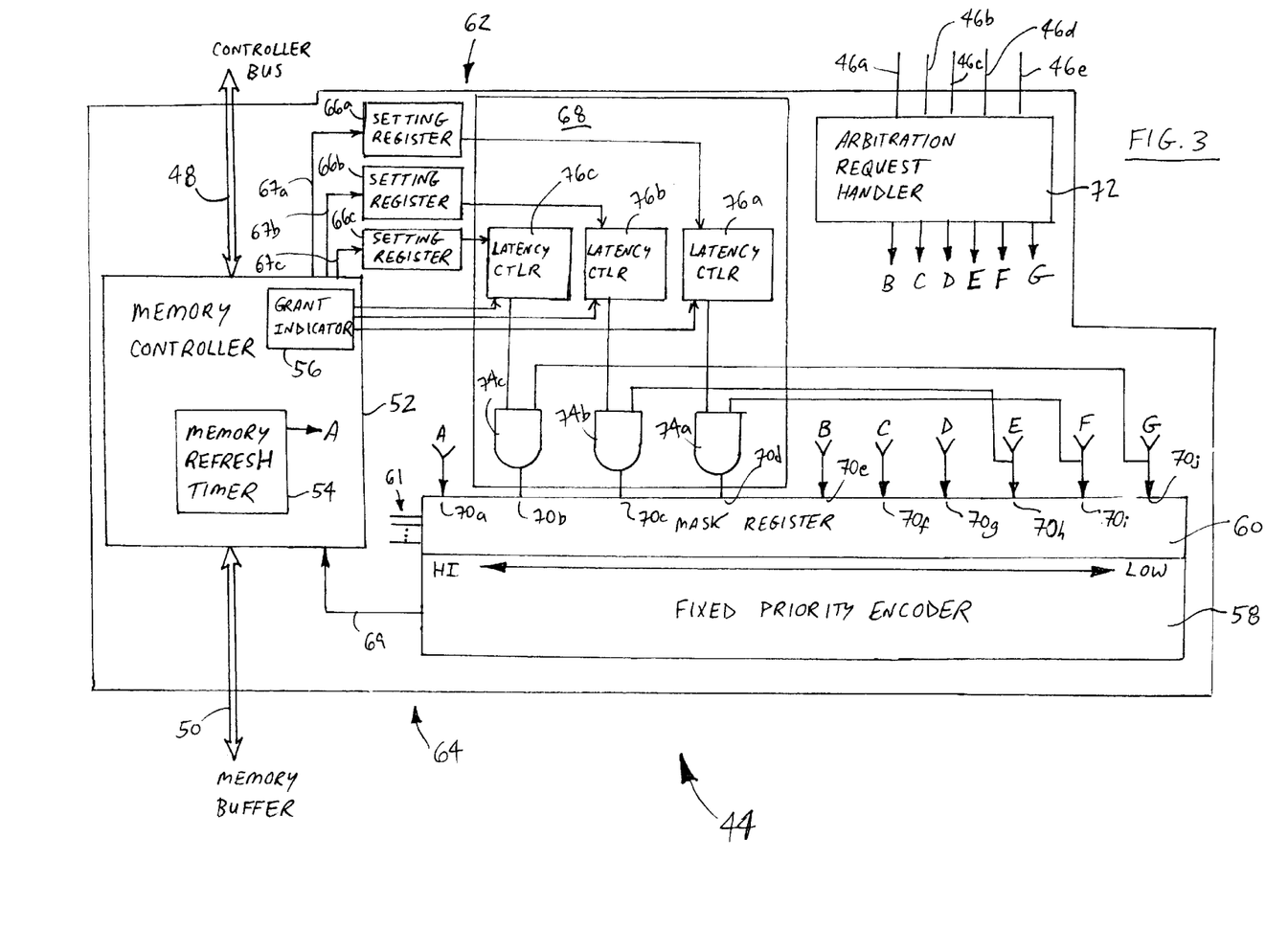
FIG. 3 is a schematic diagram of the memory arbitrator/controller illustrated in FIG. 2.

FIG. 3 provides a more detailed schematic block diagram of the illustrated memory arbitrator/controller 44. The illustrated memory arbitrator/controller 44 comprises generally a latency monitor 62 coupled to a buffer access controller 64. Latency monitor 62 monitors a latency parameter indicative of the buffer channel access latency for certain clients. Buffer access controller 64 controls when a given client is given access to the buffer channel in accordance with the monitored latency parameter. In the illustrated embodiment, buffer access controller 64 comprises a memory controller 52 to which a bus interface 48 and a buffer channel 50 are each coupled. Buffer access controller 64 further comprises a fixed priority encoder 58. Latency monitor 62 comprises in the illustrated embodiment a plurality of setting registers 66a–66c and a priority override circuit 68.

Memory controller 52, comprises, among other elements (not specifically shown), a memory refresh timer 54 and a grant indicator 56. Memory controller 52 performs such functions as intercepting client requests for access to memory buffer 32, and notifying clients when access has been granted to memory buffer 32 by use of grant indicator 56. Memory controller 52 controls the storing of data to memory buffer 32 via buffer channel 50.

Memory controller 52 performs further functions associated with determining when a given client is to be given access to buffer channel 50. For example, memory controller 52 can make adjustments to buffer access controller 64 and/or to latency monitor 62 to thus change when a given client is given access to buffer channel 50 in accordance with the monitored latency parameter. Memory controller 52 comprise, e.g., known control circuit components comprising a controller, registers, and memory configured to carry out its various functions.

Fixed priority encoder 58 may comprise a known type of fixed priority encoder having an output 69 for signaling to memory controller 52 that access should be given to a particular client via fixed priority encoder output line 69. Fixed priority encoder 58 has a range of access request inputs 70a–70j; starting with one at its left end 70a with a higher priority and ending with input 70j at its right end having a lowest priority. A mask register 60 may be provided to mask the various inputs to fixed priority encoder 58 by simply activating one or more mask lines 61. Mask register 60 may comprise a plurality of AND gates, one input of each AND gate receiving a respective access input of fixed priority encoder 58, while the other input of each AND gate is connected to a corresponding mask line 61. The presence of a low signal input at a given mask line will cause a zero to be output by the corresponding AND gate within mask register 60, thereby cancelling out any signal at the associated access request input.

Memory arbitrator/controller 44 is further provided with an arbitration request handler 72, which receives arbitration requests via arbitration request lines 46a–46e, and when an arbitration request is being made outputs a corresponding high level requester signal B, C, D, E, F, or G.

When fixed priority encoder 58 receives a high signal at one or more of its access request inputs 70a–70j (indicating an access request) it acts on the access request corresponding to the highest priority access request input. It treats the left-most high signal level as having the highest priority, and accordingly outputs a signal on fixed priority encoder output line 69 indicating to memory controller 52 that the client corresponding to the left-most high signal level is to be granted access to memory buffer 32. In the illustrated embodiment, the highest priority client comprises a memory refresh operation which is requested via a requester signal A input to access request input 70a. When access is granted to this client, memory buffer 32 is refreshed. Memory buffer 32 is periodically refreshed under control of memory refresh timer 54, which outputs the requestor signal A.

Requestor signals B–G are respectively coupled to access request inputs 70c–70j 70j. In the illustrated embodiment, requester signal B corresponds to servo data being either fetched from or stored to memory buffer 32 upon the request of disk controller/servo 38 via arbitration request line 46b.

Request signal C pertains to cache manager data which is to be stored in or retrieved from memory buffer 32 upon the request of cache manager 40 via arbitration request line 46c.

Requestor signal D pertains to micro data to be stored to or retrieved from memory buffer 32 per the request of disk controller/servo 38, which signals such request via arbitration request line 46b.

Requestor signal E corresponds to host data to be stored in memory buffer 32 per the request of host I/O interface 36 via arbitration request line 46e.

Requestor signal F pertains to disk data to be read from the disk media and stored in memory buffer 32, and corresponds to an access request made by disk I/O interface 42 via arbitration request line 46d.

Requestor signal G corresponds to a micro-instruction prefetch which involves the fetching of a micro-instruction from memory buffer 32 per the request of microprocessor 34 via arbitration request line 46a.

When access is given to a particular requesting client, the appropriate-signal is forwarded from fixed priority encoder to memory controller 52 via output 69, causing memory controller 52 to provide the client access to buffer channel 50. The requesting client handles the exchange of data with memory buffer 32 in the form of-a burst of a limited number of bytes, and upon the completion of a given data transfer burst, relinquishes controller bus 33, and accordingly relinquishes access to buffer channel 50. Buffer channel 50 is accessed by the various clients in a "pipeline" fashion.

The memory buffer clients corresponding to requester signals E, F, and G are provided with priorities which are not permanent. That is, priority override circuit 68 is connected to override the default priorities given to these clients in accordance with a monitored latency parameter indicative of the buffer channel access latency associated with an access request of any one of these clients.

More specifically, fixed priority override circuit 68 comprises AND gates 74a–74c, each of which has an input coupled directly to a respective access request input 70i, 70h and 70j. The other input of each of AND gates 74a–74c, when receiving a high signal level input, will cause a high level arbitration request input from either of requester signals E, F or G to be overridden. That is, when the two inputs of any given AND gate 74a, 74b, 74c are at a high level, an arbitration access request is signaled at access requests inputs 70d, 70c, or 70b. Requestor signal Client E is connected directly to an input of the middle AND gate 74b. Requestor signal G is connected directly to an input of the higher priority AND gate 74c. Requestor signal F is connected to the lower priority AND gate 74a. Accordingly, requestor signal G (and its corresponding client), which normally has the lowest priority, will be given an override priority that is higher than the priority given to either of requestor signals E or F, even when their priorities are overridden by activation of either of AND gates 74b and 74a.

Each of the override AND gates 74a–74c is triggered by a respective latency controller 76a, 76b, and 76c. Each latency controller 76a, 76b or 76c comprises a counter which counts an amount of time elapsing from a time at which a buffer access request was last granted to the corresponding client. Each of the latency controllers 76a–76c provides a high signal level to an input of a corresponding one of the AND gates 74a–74c to indicate to fixed priority encoder 58 when a threshold delay has been reached by the counter. Corresponding setting registers 66a–66c comprise respective values each representing a threshold delay in granting a given client access to memory buffer 32. Memory controller 52 may program, and thus modify in a dynamic fashion, the values input in each of the respective setting registers 66a–66c by way of input lines 67a–67c.

As noted above, the requester signal F corresponds to disk data either to be written to or read from the disk media per the access request of disk I/O interface 42. Memory controller 52 may be programmed to change the values in one or more of the setting registers dynamically to accommodate different operation modalities of memory arbitrator/controller 44. For example, to give the application 22 the appearance of quicker disk data access when a disk read operation is performed, a relatively small threshold value may be set in disk data setting register 66a. On the other hand, when disk data is to be written to the disk media, from memory buffer 32, a higher threshold may be appropriate. Accordingly, when a disk write is Being performed as opposed to a disk read, memory controller 52 may be programmed to change the value in disk data setting register 66a to a higher value.

Figure 4:
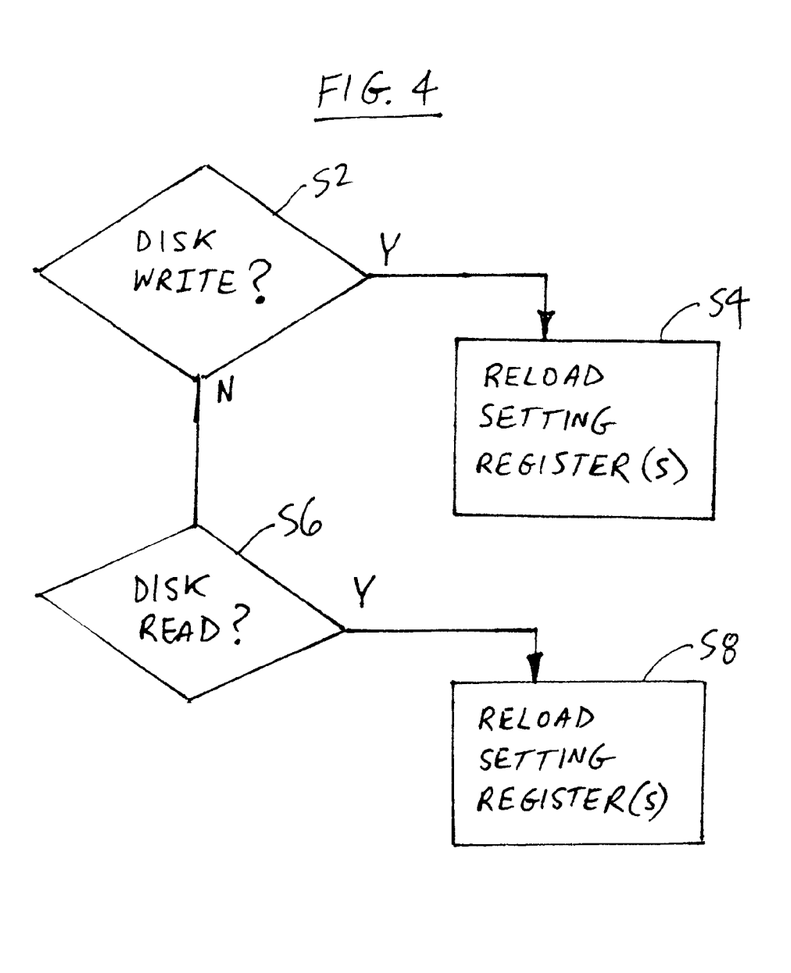
FIG. 4 is a flow chart illustrating a portion of the process that may be carried out by the memory controller illustrated in FIG. 3.

An exemplary process for changing the values in the disk data setting register 66a is illustrated in FIG. 4. Per the illustrated process steps, a determination is made by memory controller 52 at step S2 as to whether the memory buffer access will comprise a disk write. If so, the process will proceed to step S4 where the value in disk data setting register 66a will be loaded to be a value appropriate for a disk write operation. However, if a determination is made at step S2 that a disk write operation is not the purpose of the memory buffer access request, the process will proceed to step S6, where memory controller 52 will determine if a disk read is to be performed. If so, the process will proceed to step S8, where disk data setting register 66a will be reloaded appropriately.

In the illustrated embodiment, certain clients are shown as being capable of receiving dynamic priority assignments, including host data, disk data, and microinstruction prefetch data. Additional or alternative clients may be provided with priority override circuit elements for dynamically changing their priority.

In the illustrated embodiment, each of the clocks which serve as latency controllers 76a–76c counts the time interval since the last time an access grant is given to its corresponding client. Alternatively, arbitration request lines carrying the requestor signals E–G may be connected to the reset inputs of their respective latency controllers 76a–76c, so that the time counted is the time from which an access request is made, which more directly corresponds to the latency of a given access request.

Memory controller 52 may comprise, among other things, a microprocessor and memory that may be software programmable to perform such functions as reloading of the values in setting registers 66a–66c to dynamically vary the extent of buffer access given to the various clients. Memory controller may be further provided with a software configurable mechanism for controlling the signal inputs to any one or more of mask lines 61 in order to mask out any one or more of the access request inputs 70a–70j.

While the invention has been described by way of an exemplary embodiment, it is understood that the words used herein are words of description, rather than words of limitation. Changes may be made, within the purview of the appended claims, without departing from the scope and the spirit of the invention in its broader aspects. Although the invention has been described herein with reference to particular structure, materials, and embodiments, it is understood that the invention is not limited to the particulars disclosed. The invention extends to all equivalent structures, mechanisms, and uses.

What is claimed is:

1. A hard disk buffer access priority subsystem, said subsystem comprising:
   a buffer having a limited storage capacity and comprising a buffer channel having a limited data transfer rate, said buffer being coupled, via said buffer channel, to disk media, to a host, to a disk controller/servo, and to a hard disk microprocessor;
   a buffer access determining mechanism for determining when a given client is to be given access to said buffer channel, said buffer access determining mechanism comprising a latency monitor for monitoring a latency parameter indicative of a buffer channel access latency for said given client and comprising a buffer access controller for controlling when said given client is given access to said buffer channel in accordance with said parameter latency;
   a request communicator coupling requestors to said buffer access determining mechanism, said requestors requesting said buffer access determining mechanism to give clients access to said buffer channel to provide access to hard disk servo data on the buffer, to provide access to host data on the buffer, and to provide access to disk data from the disk media on the buffer, said clients when given access to said buffer channel writing data to or reading data from said buffer via said buffer channel;
   wherein said latency monitor monitors a fit latency parameter indicative of a buffer channel access latency for a request for access to host data on the buffer, and monitors a second latency parameter indicative of a buffer channel access latency for a request for access to disk a from the disk media on the buffer, and
   wherein said buffer access controller controls the access provided to a client to said buffer channel in accordance with said first and second latency parameters so that one of the request for access to host data on the buffer and the request for access to disk data from the disk media on the buffer is moved up in priority.

2. The hard disk buffer access priority subsystem according to claim 1, wherein said buffer access determining mechanism comprises inputs to receive requests from requesters for client access to said buffer channel—to refresh the buffer memory, to provide access to hard disk servo data on the buffer, to provide access to hard disk cache manager data on the buffer, to provide access to microdata on the buffer at the request of said disk controller/servo, to provide access to host data on the buffer, to provide access to disk data from the disk media on the buffer, and to provide access to microinstruction prefetch data on the buffer.

3. The hard disk buffer access priority subsystem according to claim 1, comprising a disk storage memory subsystem, comprising a translator for receiving memory access requests and translating said memory access requests to memory access requests corresponding to actual addresses located in said buffer.

4. The hard disk buffer access priority subsystem according to claim 1, wherein said buffer comprises a volatile high transfer rate memory.

5. The hard disk buffer access priority subsystem according to claim 1, wherein said buffer comprises a random access memory.

6. The hard disk buffer access priority subsystem according to claim 1, wherein said buffer access determining mechanism comprises an arbitrator.

7. The hard disk buffer access priority subsystem according to claim 1, wherein said latency monitor comprises a setting register holding a value representing a threshold delay in granting a given client access to said buffer, a counter counting an amount of time elapsing from a reset time, and a high latency signaller for signaling to said buffer access controller when said threshold delay has been reached by said counter.

8. The hard disk buffer access priority subsystem according to claim 7, wherein said setting register is software programmable.

9. The hard disk buffer access priority subsystem according to claim 7, wherein said buffer channel access controller comprises a priority-based arbitrator which assigns to an access request from said given client a default priority when said threshold delay has not been reached by said counter and a higher priority when said threshold delay has been reached by said counter.

10. The bard disk buffer access priority subsystem according to claim 9, wherein said priority-based arbitrator comprises a fixed-priority encoder.

* * * * *